(12) United States Patent
Djukic et al.

(10) Patent No.: US 10,015,057 B2
(45) Date of Patent: Jul. 3, 2018

(54) REPRESENTATIVE BANDWIDTH CALCULATION SYSTEMS AND METHODS IN A NETWORK

(71) Applicants: Petar Djukic, Ottawa (CA); Todd Morris, Stittsville (CA); Romualdas Armolavicius, Stittsville (CA)

(72) Inventors: Petar Djukic, Ottawa (CA); Todd Morris, Stittsville (CA); Romualdas Armolavicius, Stittsville (CA)

(73) Assignee: Ciena Corporation, Hanover, MD (US)

( * ) Notice: Subject to any disclaimer, the term of this patent is extended or adjusted under 35 U.S.C. 154(b) by 346 days.

(21) Appl. No.: 14/604,875

(22) Filed: Jan. 26, 2015

(65) Prior Publication Data
US 2016/0218943 A1 Jul. 28, 2016

(51) Int. Cl.
G06F 15/173 (2006.01)
H04L 12/24 (2006.01)
H04L 12/26 (2006.01)

(52) U.S. Cl.
CPC ............ H04L 41/142 (2013.01); H04L 43/04 (2013.01); H04L 43/0894 (2013.01)

(58) Field of Classification Search
CPC .... H04L 41/142; H04L 43/04; H04L 43/0894
USPC .......................................................... 709/224
See application file for complete search history.

(56) References Cited

U.S. PATENT DOCUMENTS

| | | | | |
|---|---|---|---|---|
| 6,707,790 B1* | 3/2004 | Wu | ........................ | H04L 47/15 370/230 |
| 6,891,798 B1* | 5/2005 | Yip | .................... | H04L 12/5601 370/230 |
| 8,705,527 B1* | 4/2014 | Addepalli | ............. | H04W 4/046 370/389 |
| 8,817,645 B2 | 8/2014 | Rui et al. | | |
| 2010/0046553 A1* | 2/2010 | Daigle | ..................... | G06F 21/35 370/474 |
| 2011/0205889 A1 | 8/2011 | Chen et al. | | |
| 2011/0244798 A1* | 10/2011 | Daigle | .................... | H04L 63/08 455/41.2 |
| 2013/0176846 A1 | 7/2013 | Callard et al. | | |
| 2014/0192767 A1 | 7/2014 | Au et al. | | |
| 2014/0229210 A1 | 8/2014 | Sharifian et al. | | |
| 2015/0055486 A1* | 2/2015 | Maggiari | ............ | H04L 41/5035 370/242 |

OTHER PUBLICATIONS

Santitoro, Ralph, "Bandwidth Profiles for Ethernet Services," Metro Ethernet Forum, pp. 1-8.

(Continued)

*Primary Examiner* — SM Rahman
(74) *Attorney, Agent, or Firm* — Clements Bernard Walker PLLC; Christopher L. Bernard; Lawrence A. Baratta, Jr.

(57) ABSTRACT

Systems and methods for a representative bandwidth calculation in a network include receiving a request for representative bandwidth information; obtaining network measurements; combining, filtering, and retiming network measurements based on the request to determine the representative bandwidth information. The systems and methods convert the combined, filtered, and retimed network measurements into the representative bandwidth information which has an additive property in an algebraic domain. The additive property enables the representative bandwidth information to be used for admission control, overbooking determinations, network planning, and/or dynamic pricing in the network.

17 Claims, 12 Drawing Sheets

(56) References Cited

OTHER PUBLICATIONS

Mysore et al., "Big data architecture and patterns, Part 3: Understanding the architectural layers of a big data solution," IBM developerWorks, Oct. 15, 2013, pp. 1-12.
Kelly, Frank, "Notes on Effective Bandwidths," Stochastic Networks: Theory and Applications, vol. 4 of Royal Statitical Society Lecture Notes Series, 1996, pp. 1-29.
Roughan et al., "Experience in Measuring Internet Backbone Traffic Variability: Models, Metrics, Measurements and Meaning," AT&T Labs—Research, pp. 1-10.
"Ethernet Services Attributes Phase 3," MEF Technical Specification MEF 10.3, pp. 1-120.
Gallego et al., "A Multiproduct Dynamic Pricing Problem and Its Applications to Network Yield Management," Operations Research, vol. 45, No. 1, Jan.-Feb. 1997, pp. 24-41.
Bertsimas et al., "Revenue Management in a Dynamic Network Environment," Transportation Science, vol. 37, No. 3, Aug. 2003, pp. 257-277.
Heinanen et al., "A Single Rate Three Color Marker," Network Working Group, Sep. 1999, pp. 1-6.
Choudhury et al., "Squeezing the Most Out of ATM," IEEE Transactions on Communications, vol. 44, No. 2, Feb. 1996, pp. 203-217.

\* cited by examiner

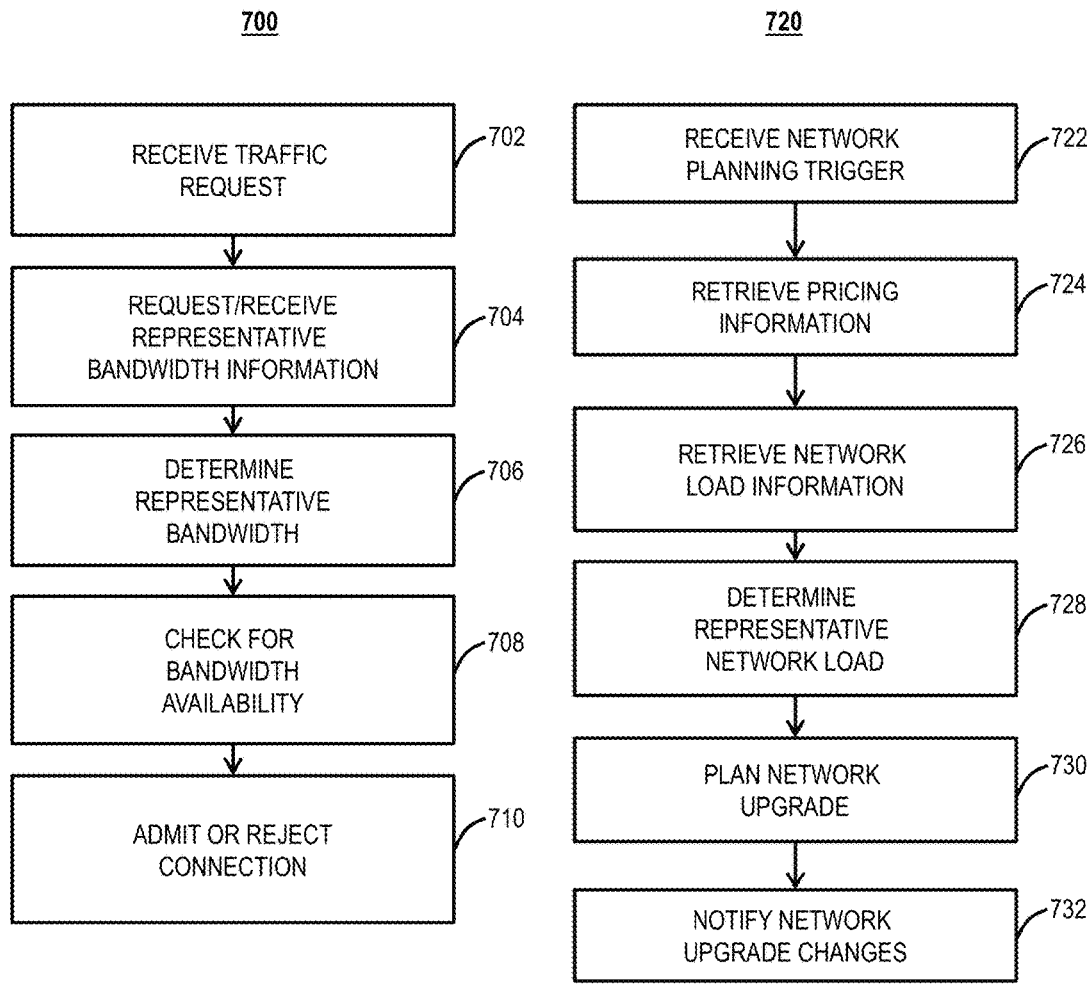

REPRESENTATIVE BANDWIDTH CALCULATION SYSTEMS AND METHODS IN A NETWORK

FIELD OF THE DISCLOSURE

The present disclosure relates generally to networking systems and methods. More particularly, the present disclosure relates to representative bandwidth calculation systems and methods in a network such as a Layer 0, 1, 2, and/or 3 network.

BACKGROUND OF THE DISCLOSURE

Software Defined Networking (SDN) and/or control planes offer an opportunity to improve current network management practices with automated optimization processes. This is in contrast with current practices where managing a network is performed by a human. With the increased complexity of networks and availability of computers for big data analysis of network measurements, it is expected that many of the tasks performed by humans may now be performed by computerized systems in a more optimal fashion. With respect to operating a network, understanding the bandwidth usage is critical for traffic management (admission control and bandwidth pricing) and for network planning (future capacity). With the complexity of modern networks, there is a need to analyze and summarize network measurements into a useful statistical representation of network traffic or network status, and then incorporate these statistics into network management or business decisions. This is a so-called bandwidth representation or representative bandwidth. Conventional approaches for bandwidth representation use a scaling factor (overbooking factor) to approximate the actual traffic from requested traffic. Scaling is determined manually by a network operator. This approach has limitations in that it does not provide sufficient information to produce optimal inputs to management algorithms; generally speaking, in today's network it is also used network-wide and is therefore a sub-optimal, one-size-fits all approach. Also, conventional approaches use parametric (Poissonian) telephony traffic approaches to approximate connection level bandwidth requests, which are not optimized for modern packet bandwidth requests, which generally do not have Poissonian characteristics.

BRIEF SUMMARY OF THE DISCLOSURE

In an exemplary embodiment, a method for a representative bandwidth calculation in a network includes receiving a request for representative bandwidth information; obtaining network measurements; and combining, filtering, and retiming the network measurements based on the request, to determine the representative bandwidth information. The combining, filtering, and retiming can include combining and filtering the network measurements at a granularity of the network, a sub-network of the network, a link of the network, a virtual network of the network, an end-to-end flow in the network, a customer in the network, or a class-of-service in the network, wherein the granularity is based on the request, and synchronizing sampling times across the network measurements. The combining, filtering, and retiming can include combining and filtering the network measurements to obtain historical time samples corresponding to busy periods in the past, based on the request, and synchronizing sampling times across the network measurements. The retimed network measurements can be merged by combining ordered lists from different sources to a requested granularity level. The method can convert the combined, filtered, and retimed network measurements into the representative bandwidth information which has an additive property in an algebraic domain. The algebraic domain is one of real-number addition using traffic envelopes as input and calculating the statistical bound considering the number of flows traversing a link; an effective bandwidth domain calculating a statistical bound on flows traversing a link; or min-plus algebra calculating a statistical bound on flows traversing a link using network calculus. The additive property enables the representative bandwidth information to be used for admission control, overbooking determinations, network planning, and/or dynamic pricing in the network.

The representative bandwidth information can be for packet data with variable bandwidth and/or connection-based services with fixed bandwidth. The representative bandwidth information can be based on a traffic envelope representation which is a value that a traffic does not exceed with some probability. The representative bandwidth information can be based on an effective bandwidth representation which has a probabilistic additive property in an effective bandwidth domain. The representative bandwidth information can be based on a service curve representation that uses a min-plus algebra domain. The method can further include utilizing the representative bandwidth information to auto-tune overbooking parameters in the network. The method can further include utilizing the representative bandwidth information for admission control to admit or reject a connection in the network. The method can further include utilizing the representative bandwidth information in network planning to reflect true network usage in the network. The method can further include utilizing the representative bandwidth information to determine a price of a connection in the network. The representative bandwidth information can be determined at various granularity levels in the network from historically observed measurements and future forecasts to automatically adjust overbooking parameters in the network.

In another exemplary embodiment, a server configured to perform a representative bandwidth calculation in a network includes a network interface; a processor coupled to the network interface; and memory storing instructions that, when executed, cause the processor to receive, via the network interface, a request for representative bandwidth information; obtain network measurements; and combine, filter, and retimed the network measurements based on the request to determine the representative bandwidth information. The combined, filtered, and retimed network measurements can be converted into the representative bandwidth information which has an additive property in an algebraic domain. The representative bandwidth information can be determined at various granularity levels in the network from historically observed measurements and future forecasts to automatically adjust overbooking parameters in the network. The server can be either a Software Defined Networking (SDN) controller or coupled to an SDN controller.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server which may be used to realize the SDN controller, in other systems, or the like;

FIG. 14 is a flow chart of an admission control process showing interaction between the admission control module and the RBC;

FIG. 15 is a flow chart of a network planning process that can be implemented in the network planning module.

DETAILED DESCRIPTION OF THE DISCLOSURE

Figure 1:
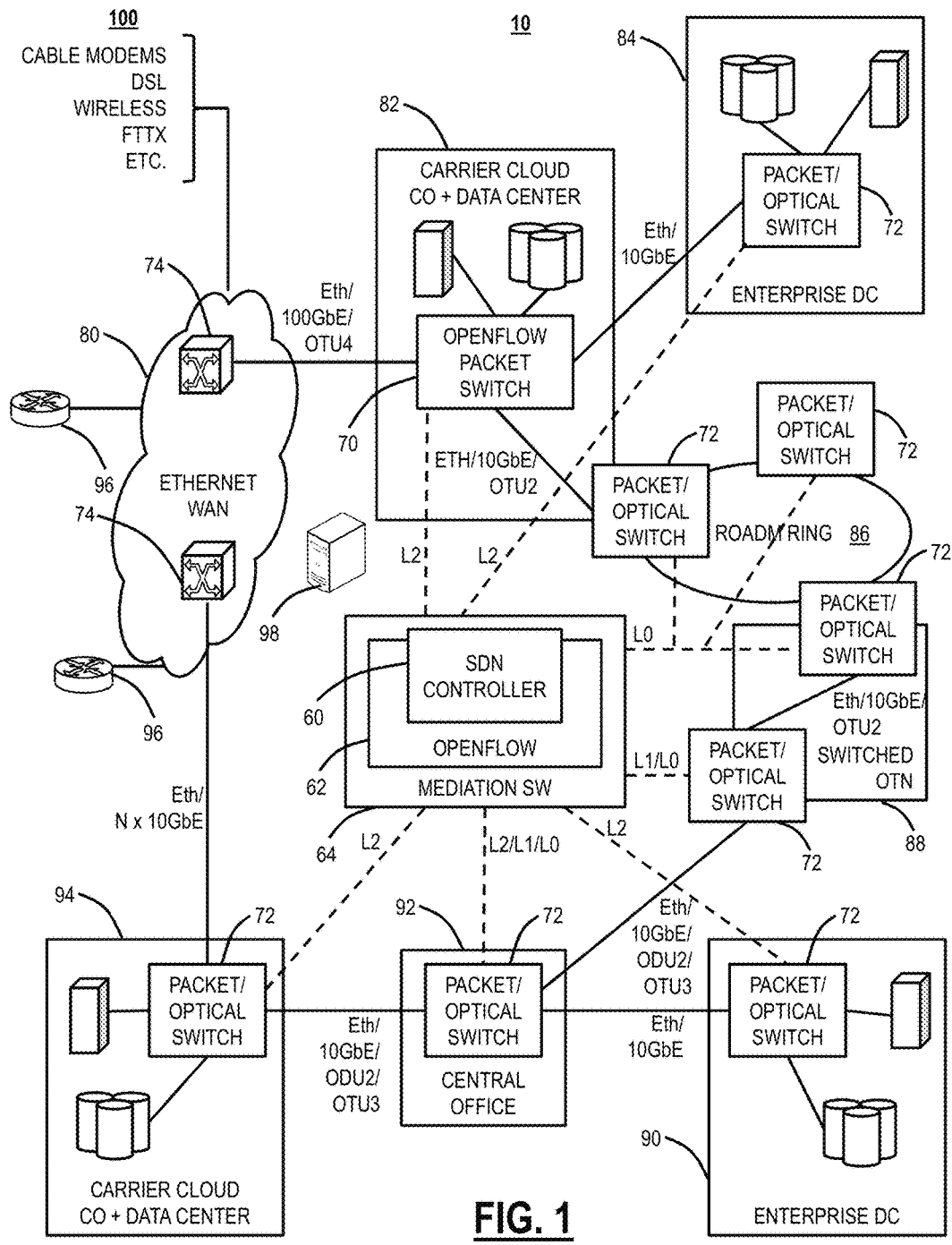
FIG. 1 is a network diagram of an exemplary SDN network.

In various exemplary embodiments, representative bandwidth calculation systems and methods are described to analyze and summarize network measurements into a useful statistical representation of network traffic or network status. That is, the systems and methods solve the problem of analyzing and summarizing network measurements into a statistical representation that is easily consumed by network management applications. This is a timely and important problem for SDN-based network management, but also applicable to control plane enabled networks. In an exemplary embodiment, the representative bandwidth calculation is utilized for admission control, network planning, and revenue maximization; of course, other embodiments are also contemplated. The representative bandwidth calculation systems and methods determine representative bandwidth usage from historical traffic measurements. Representative bandwidth is a statistical representation of observed traffic, which has an additive property in terms of traffic aggregation. If traffic shares a link, their representative bandwidths are additive on the link in the sense that their cumulative traffic has a known probability of exceeding the link capacity. The additive property of the representative bandwidth makes it useful, for example, for network planning, admission control, and dynamic pricing applications with stochastic inputs. Representative bandwidth may be less than the actual requested bandwidth, allowing for admission control, network planning, revenue maximization or other network management procedures to oversubscribe (overbook) existing resources.

An example of representative bandwidth information may be a single overbooking factor used to scale the requested bandwidth. Other examples representative bandwidth information can include more direct bandwidth representations, such as stochastic traffic envelopes, effective bandwidths, or stochastic service curves. In any case, the representative bandwidth information is estimated from observed traffic and is related to the requested bandwidth, as well as, network status. For example, related to admission control, a user may overestimate/underestimate how much bandwidth is used; the purpose of representative bandwidth for this user is to ensure the resources are not overcommitted/undercommited for that user. Along similar lines, a user may request bandwidth during a busy/non-busy period in which case it may be advantageous that the representative bandwidth overestimates/underestimates how much that user may consume if accepted into the network.

The systems and methods contemplate implementation via an SDN application or via a stand-alone application coupled to a network manager, control plane, etc. In the context of SDN, a network analytics module is an umbrella term for big-data analytics based on network measurements. The systems and methods described herein presents technique for an analysis layer of the "big-data" architecture, as applied to network analytics. In the context of network analytics, the analysis layer provides summary statistics of network measurements, which are useful for other modules to use in their operation (i.e., a consumption layer). The systems and methods present various exemplary embodiments of summarizing information into useful statistical representations of network load and status (utilization), which can be used by network planning, dynamic pricing, and other modules in an SDN system or the like. These modules require visibility of the network status as well as indication of past network performance and bandwidth usage to enable full functionality.

In an exemplary embodiment, a method for determining the representative bandwidth of network traffic uses at least one of the following as parameters: type or value of oversubscription, type or value of bandwidth request, scheduled time of bandwidth request, historical time range of the measurements associated with the request, granularity and fidelity of the request. The method uses historical network measurements combined and filtered at various granularities such as network, sub-network, link, virtual network, or end-to-end flow, customer, or class-of-service. The method transforms the statistical properties of the data into a representative bandwidth and returns the information to the requestor. The traffic may be packet-based, connection-based, or both and the representative bandwidth has an additive property in some algebraic domains. The algebraic domain may be real-number addition, using traffic envelopes as input and calculating the statistical bound considering the number of flows traversing a link. The algebraic domain may be the effective bandwidth domain calculating the statistical bound on flows traversing a link in the effective bandwidth domain. The algebraic domain may be the min-plus algebra calculating the statistical bound on flows traversing a link using network calculus.

In another exemplary embodiment, a method for adjusting internal overbooking calculation parameters uses network information feedback that decreases overbooking if network indicates increased congestion and adjust representative bandwidth if the network does not report increased congestion in a period of time. The network information feedback may be packet losses, measured delay crossing the threshold, or utilization crossing a threshold on the links or end-to-end. The current practice is that the network operator manually adjusts the overbooking factor (representative bandwidth information of network flows) and since it is a human operator making the adjustments, the current representative bandwidth information is limited to a single scaling that can be applied to the requested network bandwidth, or a scaling for each class of service. The network operator may adjust the scaling if the network utilization exceeds some rule-of-thumb utilization. In the systems and methods described herein, the representative bandwidth information is determined for each bandwidth request at various granularity levels, representative bandwidth information is determined from historically observed measurements a more exhaustive set of representative bandwidth information is provided, where by example multiple representative bandwidth domains, and internal overbooking parameters are automatically adjusted from network feedback.

Exemplary SDN Network

Referring to FIG. 1, in an exemplary embodiment, a network diagram illustrates an exemplary network 10 for describing the systems and methods. Those of ordinary skill in the art will recognize that any network configuration, such as at Layers 0, 1, 2, and/or 3, is contemplated with the systems and methods, and the network 10 is merely presented for illustration. The network 10 is an SDN network, which includes an SDN controller 60 with the ability to (logically) centrally program provisioning of forwarding in the network 10 in order for more flexible and precise control over network resources to support new services. Application Programmable Interfaces (APIs) provide programmatic communication between the SDN controller 60 and either (i) specific applications or (ii) programmable network devices such as communication over Transaction Language-1 (TL-1) or Common Object Request Broker Architecture (CORBA) calls. OpenFlow (www.openflow.org) is an example implementation of a special OpenFlow interface 62 from the SDN controller 60 to programmable network devices. It may or may not communicate via mediation software 64, to each switch 70, 72, 74 in the network 10 in order to provision the forwarding table at each switch along a connection path in order to instantiate the forwarding behavior needed for the connection. OpenFlow is described, for example, in the OpenFlow Switch Speciation, Version 1.1.0 (February 2011)—Version 1.3.0 (June 2012), the contents of which are incorporated by reference herein. While OpenFlow describes one version of an SDN interface, other SDN protocols besides OpenFlow (such as Netflow, REST, etc.) are also contemplated with the systems and methods described herein.

Again, for illustration purposes, the network 10 includes an OpenFlow-controlled packet switch 70, various packet/optical switches 72, and packet switches 74 with the switches 70, 72 each communicatively coupled to the SDN controller 60 via the OpenFlow interface 62 and the mediation software 64 at any of Layers 0-3 (L0 being DWDM, L1 being OTN, and L2 being Ethernet). The switches 70, 72, 74, again for illustration purposes only, are located at various sites, including an Ethernet Wide Area Network (WAN) 80, a carrier cloud Central Office (CO) and data center 82, an enterprise data center 84, a Reconfigurable Optical Add/Drop Multiplexer (ROADM) ring 86, a switched OTN site 88, another enterprise data center 90, a central office 92, and another carrier cloud Central Office (CO) and data center 94. The network 10 can also include IP routers 96 and a network management system (NMS) 98. Note, there can be more than one of the NMS 98, e.g., an NMS for each type of equipment—each communicatively coupled to the SDN controller 60. Again, the network 10 is shown just to provide context and typical configurations at Layers 0-3 in an SDN network for illustration purposes. Those of ordinary skill in the art will recognize various other network configurations are possible at Layers 0-3 in the SDN network.

The switches 70, 72, 74 can operate, via SDN, at Layers 0-3. The OpenFlow packet switch 70, for example, can be a large-scale Layer 2 Ethernet switch that operates, via the SDN controller 60, at Layer 2 (L2). The packet/optical switches 72 can operate at any of Layers 0-3 in combination. At Layer 0, the packet/optical switches 72 can provide wavelength connectivity such as via DWDM, ROADMs, etc., at Layer 1, the packet/optical switches 72 can provide time division multiplexing (TDM) layer connectivity such as via Optical Transport Network (OTN), Synchronous Optical Network (SONET), Synchronous Digital Hierarchy (SDH), etc., at Layer 2, the packet/optical switches 72 can provide Ethernet or Multi-Protocol Label Switching (MPLS) packet switching and at Layer 3 the packet/optical switches can provide IP packet forwarding. The packet switches 74 can be traditional Ethernet switches that are not controlled by the SDN controller 60. The network 10 can include various end user access technologies 100, such as, without limitation, cable modems, digital subscriber loop (DSL), wireless, fiber-to-the-X (e.g., home, premises, curb, etc.), and the like.

Generally, SDN opens new mechanisms for network management in the network 10. Specifically, network services are provided through real-time provisioning of on-demand services by a centralized control plane which can be referred to as an SDN management plane. A network service may refer to a connection between clients (e.g., point-to-point Virtual Private Network (VPN) L3 or L2 connection, over OTN or other technologies); a virtual network with multiple point-to-point connections, point-to-multipoint connections, or multipoint-to-multipoint connections between multiple client sites (e.g., data centers, many-to-many business connections); or the like.

The network services may be on-demand requiring immediate, deferred or periodic bandwidth. Immediate bandwidth may be required for connections that have real-time requirements (i.e., direct business to business connection such as banks), deferred bandwidth may be for connections that know their future demands (i.e., live television events, planned network migration, etc.), and periodic bandwidth may be for connections that have a periodic bandwidth pattern (i.e., back-up between data centers, daily mobile cellular traffic, etc.)

The SDN business model can require specialized management plane entities to provide real-time operations including the representative bandwidth calculator described herein. Dynamic demands from customers, users, etc. may be for packet services, which are bursty and may not have a well-known traffic envelope. It is advantageous for network operators to have a more accurate idea of the bandwidth demand (other than the bandwidth packet-data request on its own) when reserving bandwidth for packet traffic, as well as for network planning and revenue planning purposes. The dynamic demands may also be for "wave" services, i.e., photonic bandwidth-wavelengths, or guaranteed bandwidth based on, for example, OTN technology.

Figure 2:
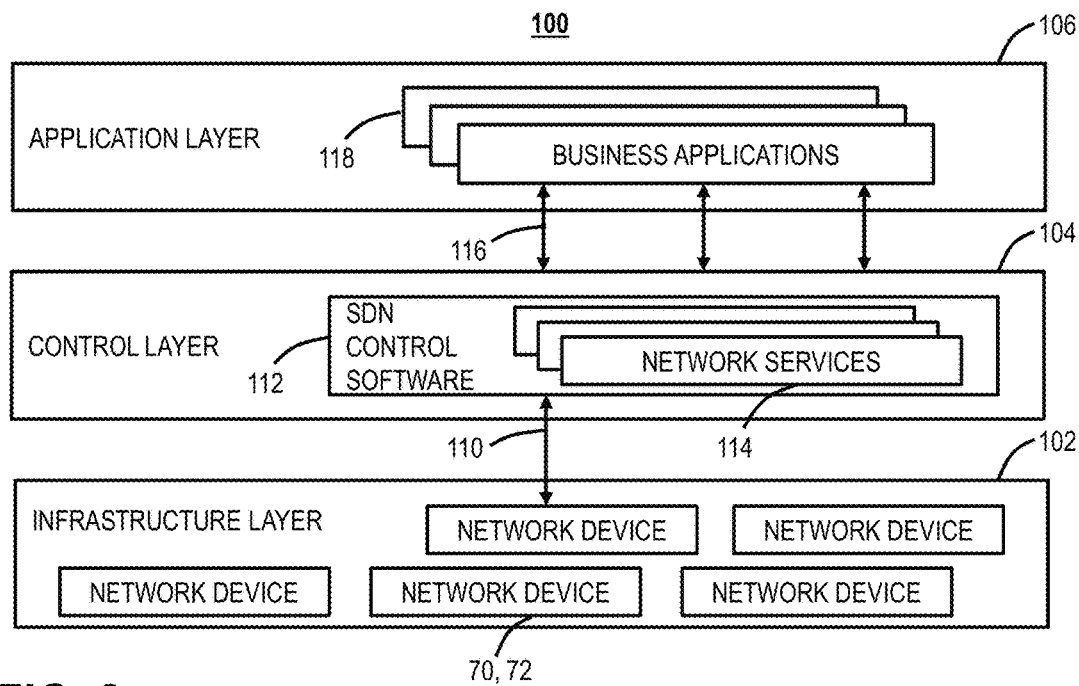
FIG. 2 is a block diagram of functional components of an SDN environment.
Figure 3:
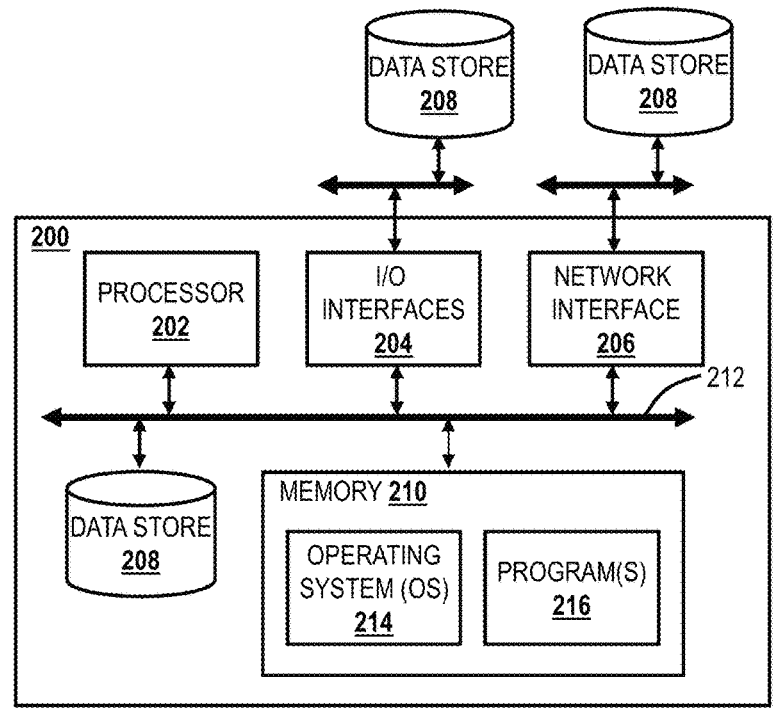

In various exemplary embodiments, a representative bandwidth calculator provides information that makes the requested bandwidth more representative of real bandwidth usage for other components in the management plane. As described herein, representative bandwidth is a statistical representation of packet traffic with properties useful for admission control, dynamic pricing, network planning purposes, etc. Past performance is taken into consideration to determine representative bandwidth of the incoming or potential future connections SDN Controller/Management Plane Referring to FIG. 2, in an exemplary embodiment, a block diagram illustrates functional components of the SDN environment 100. The SDN environment 100 includes a programmable infrastructure layer 102, a control layer 104, and an application layer 106. The layers 104, 106 can be implemented on a server or the like such as illustrated in FIG. 3 and the functional components can be implemented in software executed on the server. The programmable infrastructure layer 102 includes network devices such as the switches 70, 72 and is communicatively coupled to the control layer 104 via an interface 110 such as OpenFlow, for example. The control layer 104 facilitates communication between the application layer 106 and the network devices 70, 72 located in programmable infrastructure layer 102. The control layer 104 includes SDN control software 112 with a plurality of network services 114. The control layer 104 provides SDN functionality to manage network services through abstraction of lower level functionality. The application layer 106 communicates to the control layer 104 through various Application Programming Interfaces (APIs) 116. The application layer 106 provides end user connectivity to the SDN environment 100 such as software modules and/or functions responsible for creating desired path and flow connections on the physical network through various business applications 118. In an exemplary embodiment, the systems and methods described herein are implemented as one of the business applications 118 on the SDN controller 60 and/or on a separate server 200.

Referring to FIG. 3, in an exemplary embodiment, a block diagram illustrates a server 200 which may be used to realize the SDN controller 60, in other systems, or the like. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touch pad, and/or a mouse. System output may be provided via a display device and a printer (not shown). I/O interfaces 204 may include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet, a wide area network (WAN), a local area network (LAN), and the like, etc. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Exemplary Control Plane Network

Figure 4:
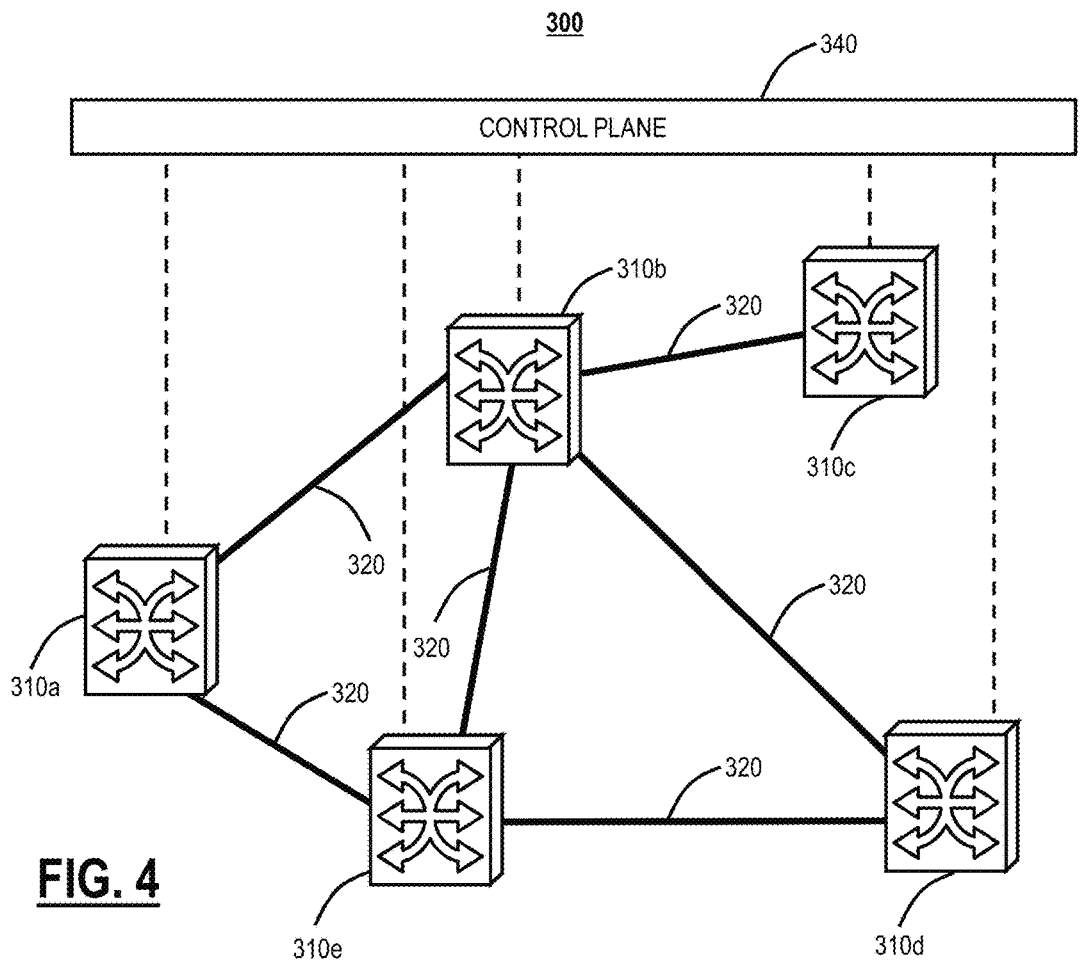
FIG. 4 is a network diagram of an exemplary control plane network with five interconnected nodes.

Referring to FIG. 4, in an exemplary embodiment, a network diagram illustrates an exemplary control plane network 300 with five interconnected nodes 310a, 310b, 310c, 310d, 310e. The nodes 310 are interconnected through a plurality of links 320. The nodes 310 communicate with one another over the links 320 through Layers 0, 1, 2, and/or 3. For example, the links 320 can be optical fibers with services at various wavelengths. The nodes 310 can be network elements which include a plurality of ingress and egress ports. The network 300 is illustrated, for example, as an interconnected mesh network, and those of ordinary skill in the art will recognize the network 300 can include other architectures, with additional nodes 310 or with less nodes 310, etc.

The network 300 can include a control plane 340 operating on and/or between the nodes 310a, 310b, 310c, 310d, 310e. The control plane 340 includes software, processes, algorithms, etc. that control configurable features of the network 300, such as automating discovery of the nodes 310, capacity of the links 320, port availability on the nodes 310, connectivity between ports; dissemination of topology and bandwidth information between the nodes 310; calculation and creation of paths for connections; network level protection and restoration; and the like. Optical (i.e., transport) networks and the like (e.g., Wavelength division multiplexing (WDM), Synchronous Optical Network (SONET), Synchronous Digital Hierarchy (SDH), Optical Transport Network (OTN), Ethernet, and the like) at various layers are deploying control plane systems and methods. Control planes provide automatic allocation of network resources in an end-to-end manner. Exemplary control planes may include Automatically Switched Optical Network (ASON) as defined in G.8080/Y.1304, Architecture for the automatically switched optical network (ASON) (February 2005), the contents of which are herein incorporated by reference; Generalized Multi-Protocol Label Switching (GMPLS) Architecture as defined in Request for Comments (RFC): 3945 (October 2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections therebetween.

In an exemplary embodiment, the control plane 340 can utilize ASON, GMPLS, OSRP, or the like. Those of ordinary skill in the art will recognize the network 300 and the control plane 340 can utilize any type of control plane for controlling the nodes 310 and establishing connections therebetween. In control plane networks, connections can include a Sub-Network connection (SNC) for ASON and OSRP or Label Switched Path (LSP) for GMPLS. Note, SNCs and ODU LSPs (or simply LSPs) can both be referred to as end-to-end paths or end-to-end signaled paths.

Representative Bandwidth

Figure 5:
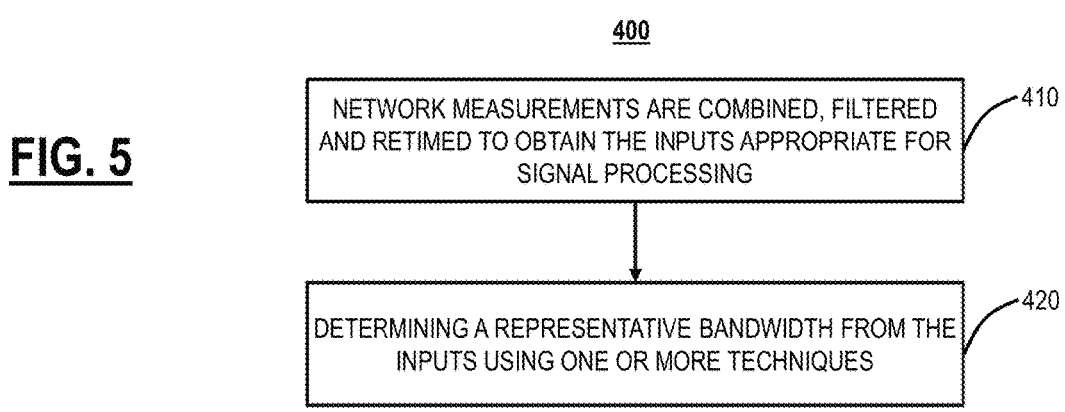
FIG. 5 is a flow chart of a representative bandwidth computation method.

Referring to FIG. 5, in an exemplary embodiment, a flow chart illustrates a representative bandwidth computation method 400. The bandwidth computation method 400 proceeds generally in two steps, corresponding to map-and-reduce methods in big-data analytics. In a first step (map), the network measurements are combined, filtered and retimed to obtain the inputs appropriate for signal processing in later steps (step 410). Combining and filtering of the data is done to obtain a representative bandwidth at a granularity of network, sub-network, virtual network, A-Z flow, flows grouped by customer, or class-of-service, as required by the application requesting the representative bandwidth. Combining and filtering may also be done based on time, for example, to obtain historical time samples corresponding to the busiest, or least busy past periods. The resampling of the combined and filtered data is required to synchronize the sampling times across the measurements and is done to the desired fidelity level which may be provided as an input to the representative bandwidth computation method 400.

In a second step (reduce), the representative bandwidth computation method 400 determines a representative bandwidth from the inputs (step 420). Three exemplary techniques for determining representative bandwidth are described herein, namely, traffic envelope, effective bandwidth, and service curve. The traffic envelope technique first de-trends the data to obtain the stochastic part of the data. The de-trended data is then used to find the level at which the traffic exceeds a prescribed bound, and is then re-trended to obtain a traffic envelope for the data. The traffic envelope is a function of time, which can be projected into the future to obtain traffic forecasts.

The second technique determines the effective bandwidth representation of the data, which has the probabilistic additive property in the effective bandwidth domain. This technique is similar to the traffic envelope technique in that it first finds the trend of the data and de-trends the data to calculate the stochastic part of the effective bandwidth calculation. The full effective bandwidth of the data is obtained by re-trending the stochastic part in the effective bandwidth domain. The service curve technique shows how much data traffic is expected to accumulate as a function of duration and can be used for traffic reservation or planning using network calculus. The service curve technique works by finding traffic envelopes for different values of data sampling (duration) for a requested time, using the traffic envelope technique. Each sampling time then represents a time on the service curve, and the service curve may be obtained by fitting through the service curve samples. A forecast of the service curve may be obtained by using forecasts of the traffic envelope.

The representative bandwidth computation method 400 uses the collected network measurements and calculates representative bandwidth usage at a granularity of network, sub-network, link, virtual network, A-Z flow, flows grouped by customer, or flows grouped by class-of-service. Three methods for determining representative bandwidth are provided. Each summarizes statistics of the observed measurements, in a way that can be used in an algebraic system associated with the representative bandwidth. Representative bandwidth can then be used for admission control, network planning and dynamic pricing of services, using the appropriate algebraic system. Representative bandwidth may be calculated for instantaneous times, as a summary of past performance, as a forecast of future traffic use, or a combination of a summary of past performance and a forecast of future traffic use.

The representative bandwidth is derived from statistical properties of the historical traffic. Thus, the representative bandwidth is a close statistical approximation of the traffic, but the representative bandwidth does not need to be equivalent to the actual traffic. It is sufficient the representative bandwidth be an approximation of the historical traffic and its forecast in terms of being additive in some algebraic system (i.e., min-plus algebra for network calculus). If multiple traffic shares a link, their representative bandwidths are additive on the link, in the sense that by the construction of the representative bandwidth, their cumulative traffic has a known probability of exceeding the link capacity. The statistical representation of the aggregate traffic can be used to determine required capacity (for network planning), determine if sufficient bandwidth is available on the link (for admission control), determine expected traffic demand for dynamic pricing usage, and the like.

The requirement for this additive property is based on how the representative bandwidth is used by other components. In many cases, it is necessary to check if a sum of traffic on some link exceeds link capacity. For example, if the sum of the traffic exceeds the link capacity, then it is likely that there will be an overloaded link. However, if the sum of the traffic does not exceed the link capacity, because of statistical multiplexing, there is still a likelihood that the link may temporarily be overloaded. A brute force way to get around this problem is to use the peak traffic, which would guarantee that the links are never temporarily overloaded, but at the additional cost. A better way is to use a probabilistic bound that traffic does not exceed some capacity.

Again, the systems and methods provide three alternative representative bandwidth representations, traffic envelope, effective bandwidth, and service curve, each with an additive property in its own algebraic system. Some statistical properties used for representative traffic may be defined by single or multiple time values such as the mean of the traffic (single time value), the envelope for which there is a portion of the time that the traffic stays below it (single time value), the "effective bandwidth" (single time value), and worst-case traffic-shaping envelope (multiple values for a time). Note that, in some cases, representative bandwidth used on a link can be used to calculate equivalent utilization by dividing the representative bandwidth by the link capacity.

Representative Bandwidth for Packet Traffic

Requested bandwidth for packet-data may be represented with peak values, which ensure the sufficient bandwidth is reserved for the users, customers, etc. For the purposes of network management or admission control, better information is needed to ensure resources are not over provisioned, which is usually obtained by scaling down the requested bandwidth. An undesirable event in packet networks is increased packet loss if the requested bandwidth is scaled too much and insufficient bandwidth is reserved or planned. Currently an "overbooking factor" is used to convert requested bandwidth to its representative bandwidth. The overbooking factor is used to scale down the requested bandwidth and obtain a more accurate view of expected bandwidth usage. Due to the complexities of network architectures, the overbooking factor is usually a network-wide scaling per class-of-service to simplify manual usage. One overbooking factor per class-of-service for all connections in the network, which may lead to an over-optimistic view of some connections, while simultaneously getting an over-pessimistic view of other connections, i.e. this is not optimal. The overbooking factor may be changed by the network operator if higher than expected utilization is observed on the links in the network (a utilization buffer is used to prevent higher than wanted packet loss if the overbooking factor is overestimated).

Since the network may deal with different traffic types, even from the same A-Z pair, or the same customer network, it is advantageous to calculate the "overbooking factor" at a finer granularity. For the each A-Z pair, e.g., used by an enterprise customer in its virtual network, some traffic may be bursty (human network usage, Voice over Internet Protocol (VoIP), etc.) and other traffic may be close to constant peak (content distribution), Furthermore, using the overbooking factor oversimplifies network usage—representative bandwidth is an equivalent but more precise concept. Representative bandwidth is a statistical representation of usage (or statistical representation of bandwidth in a time period) that is calculated from statistical properties of actual traffic. The overbooking factor may be obtained by dividing the requested bandwidth by the representative bandwidth (the opposite is also true). Due to their one-to-one correspondence, "overbooking factor" and representative bandwidth are used interchangeably herein—"representative bandwidth information" is a catch all term for either one or both of them. Since the packet traffic may exhibit long-term and seasonal time characteristics, the representative bandwidth information for each time period may be significantly different from other time periods. It is also possible to forecast representative bandwidth information by considering long-term traffic trends.

Representative Bandwidth for Connection-Based Traffic

The concept of representative bandwidth is also valid for connection-based services with fixed bandwidth requirements, e.g. Time Division Multiplexed (TDM) traffic. The representative bandwidth calculator may be used for both packet-based and on-demand connection-based networks. For connection-based services, the variability of bandwidth depends on the number and size of connections simultaneously in the network. An undesirable event is that a service is requested, but the request is blocked due to insufficient capacity, which may happen if the number of simultaneous connections is underestimated.

The current practice is to model connection service with the average rate of bandwidth request arrivals time $\lambda$ and the hold time h. Given $\lambda$ and h the average number of connections is n=$\lambda$h. By Erlang-B formula P_b=($\lambda$,h,) to find link size m for a given blocking probability connection P_b. Erlang-B formula is valid for Poisson type arrivals and departures, which may not be a good model in on-demand OTN networks.

The representative bandwidths can be used for connection-based bandwidth requests (outside the context of variable data rate packet connections). Representative bandwidths as shown can be used to calculate the likelihood that the amount of requested fixed bandwidth exceeds available link capacity. Since the statistics are obtained from the empirical Cumulative Distribution Function (CDF) of the call records, the approach described herein is appropriate for connection-based services with any statistical distribution. Later it is shown how connection call records can be processed to obtain inputs appropriate for representative bandwidth representation of connection-based services.

SDN Management Plane

Figure 6:
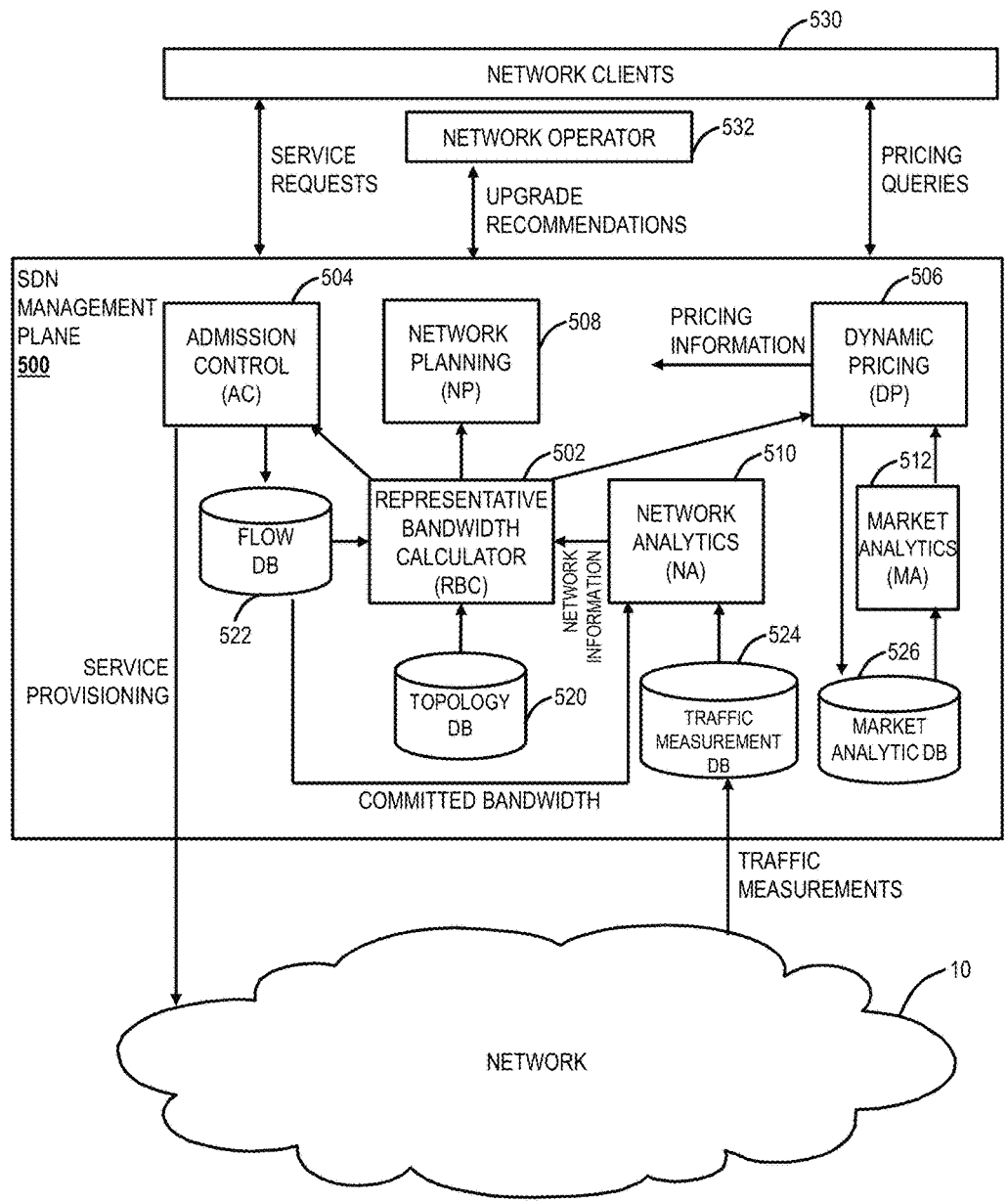
FIG. 6 is a block diagram of an SDN management plane with a representative bandwidth calculator included therein.

Referring to FIG. 6, in an exemplary embodiment, a block diagram illustrates an SDN management plane 500 with a representative bandwidth calculator (RBC) 502 included therein. The SDN management plane 500 is an ecosystem of logical components, which work together to provide network resource management. The logical components contemplate implementation in the SDN controller 60, the server 200, etc. The SDN management plane enables on-demand services with real-time negotiation of SLAs (through admission control 504), dynamic pricing of services (through dynamic pricing 506), automated network planning (through network planning 508), and the like. The RBC 502 is a logical component that provides information about the true network usage of connections. Note, Service Level Agreement (SLA) requests may contain bandwidth requests which do not represent the true bandwidth usage. Dynamic pricing inquiries require a realistic expectation of future bandwidth usage, and network planning requires realistic expectations of future bandwidth usage. The SDN management plane 500 can include various modules such as the RBC 502, the admission control 504 module, the dynamic pricing 506 module, the network planning 508 module, a network analytics 510 module, and a market analytics 512 module. Also, the SDN management plane 500 can include databases such as a topology database 520, a flow database 522, a traffic measurement database 524, and a market analytic database 526. The SDN management plane 500 is communicatively coupled to the network 10, network clients 530, and a network operator 532.

The admission control 504 module negotiates with outside entities on behalf of the SDN controller 60, and determines if a connection/network should be accepted or not. For packet-based connections, the requested bandwidth may be higher than what is actually needed to support their QoS (due to statistical multiplexing on links shared with other connections). For example, packet-based connections may have Committed Information Rate (CIR) and Excess Information Rate (EIR). The admission control 504 module may call the RBC 502 module to determine how to scale the requested bandwidth of an incoming connection for the purposes of determining if there is sufficient capacity left over in the network. The admission control 502 module can also connect to a Path Computation Engine (PCE) module to see if a path of sufficient bandwidth is available.

The network planning 508 module observes the network status and recommends network upgrades, such as to the network operator 532. The network planning 508 module obtains traffic information from the network analytics 510 module (forecast of flow requests) and the dynamic pricing 506 module (pricing). The network planning 508 module may use the RBC 502 module to obtain a better estimate of bandwidth from the flow requests, especially for future scheduled client flows which were in the network in the past, by finding representative bandwidth of those client flows corresponding to past measured traffic for the same amount of requested bandwidth. The dynamic pricing 506 module determines the price for a connection to be accepted in the network. If usage-based pricing is used, the RBC 502 module can be used to predict the actual use by the incoming connection and to prevent selling the service too cheaply, especially if clients pay for each transmitted bit and they may request higher bandwidth (at discounted cost), but may only use a small portion of it.

The traffic measurement database 524 collects the current information about the network into a data store (i.e. packet counters, allocated bandwidths, traffic patterns, connection behavior). The topology database 520 contains information about link properties in the network: connections between network elements, maximum rate between network elements, etc. The topology database 520 may contain information about logical links (links that span multiple hops, available OTN containers, etc.) and information about physical links (information about optical spectrum allocation, availability of OTN containers and their type, shared risk link groups, etc.).

The flow database 522 contains information about promised bandwidth for A-Z flows, including the promised bandwidth on links, etc. The market analytics database 526 contains information about pricing queries and bought bandwidth. The network analytics 510 module provides measured network measurement required to obtain representative bandwidth information. The information may be in terms of network statistic summaries, and the network analytics 510 module may be sub-module of the RBC 502 module.

Figure 7:
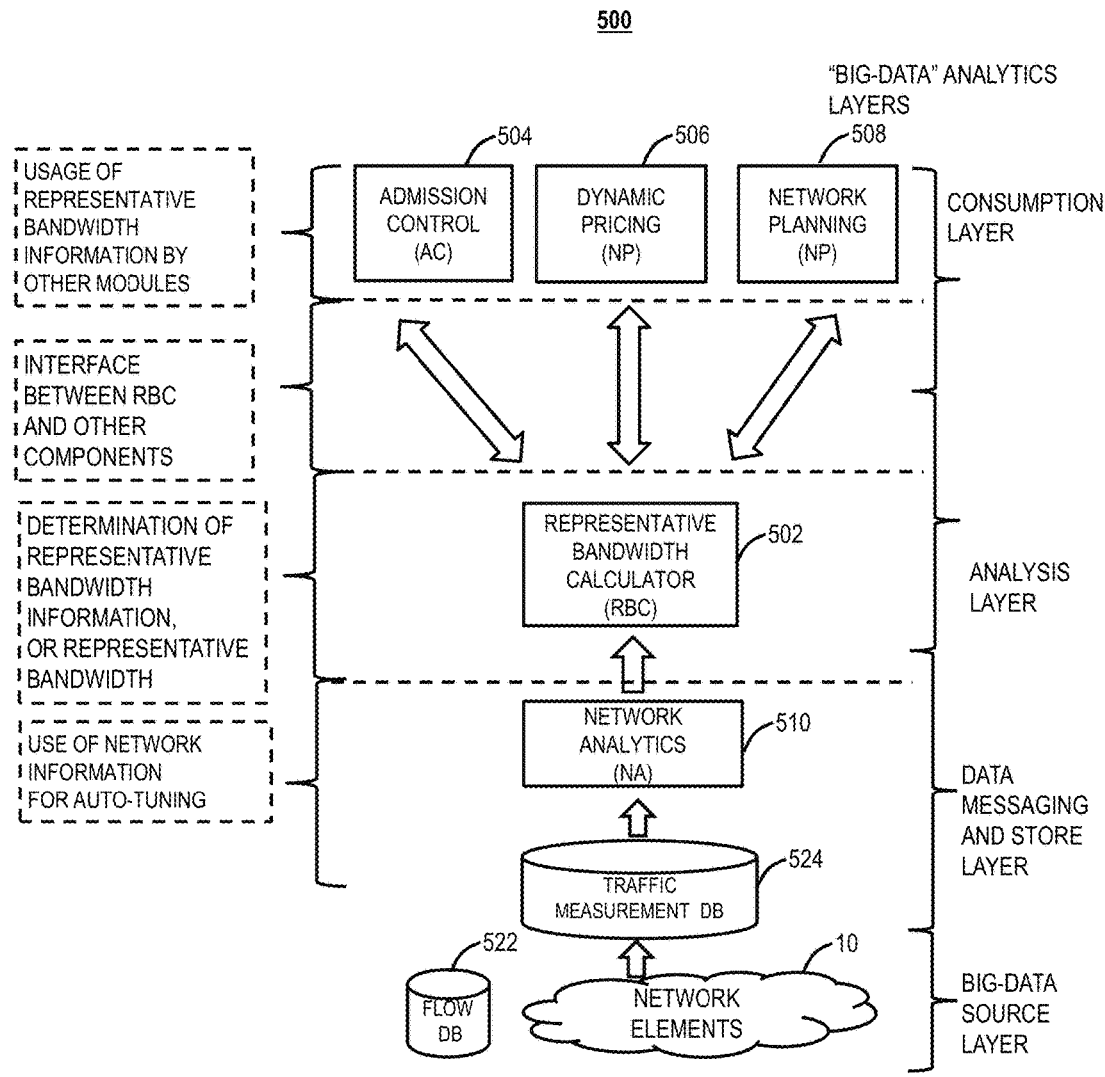
FIG. 7 is a flow diagram of the SDN management plane of FIG. 6 and associated interaction with the RBC module.

Referring to FIG. 7, in an exemplary embodiment, a flow diagram illustrates the SDN management plane 500 and associated interaction with the RBC 502 module. The Representative Bandwidth Calculator (RBC) 502 module receives representative bandwidth information requests and provides representative bandwidth information to other modules. The RBC 502 module determines the representative bandwidth information based on requests from other modules and can use the network information to auto-tune internal parameters. Note, in various exemplary embodiments described herein, the representative bandwidth calculation is described with reference to the RBC 502 and the SDN management plane 500. Those of ordinary skill in the art will recognize the systems and methods described herein also contemplate operation without SDN, such as with the control plane network 400 or the like.

Representative Bandwidth Calculator Operation

Figure 8:
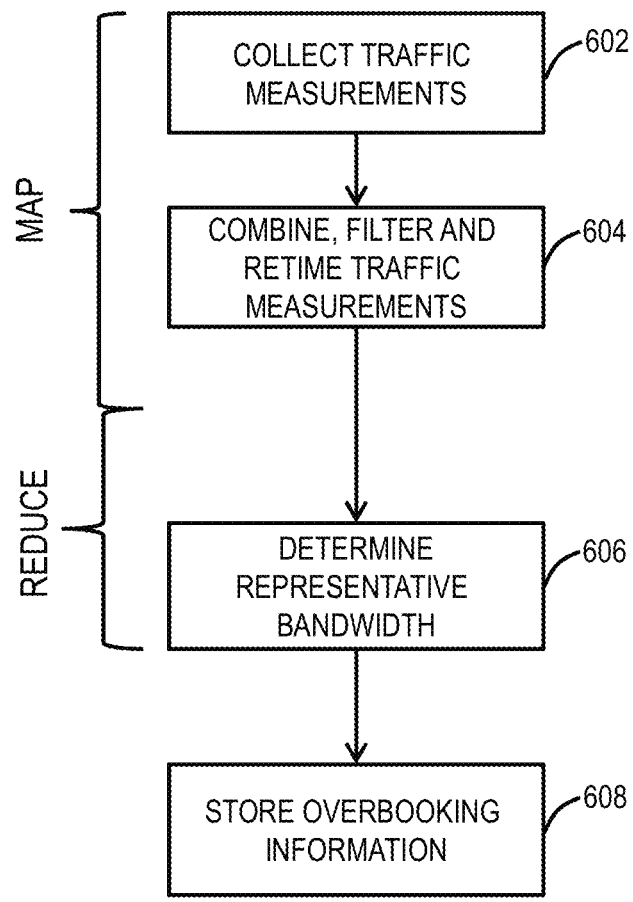
FIG. 8 is a flow chart of a representative bandwidth calculator operation.

Referring to FIG. 8, in an exemplary embodiment, a flow chart illustrates a representative bandwidth calculator operation 600. The representative bandwidth calculator operation 600 includes collecting traffic measurements (step 602); combining, filtering, and retiming traffic measurements (step 604); and determining representative bandwidth (step 606). Optionally, the representative bandwidth calculator operation 600 includes storing overbooking information (step 608). The RBC 502 module can provide the overbooking factor or representative bandwidth upon request. The representative bandwidth information may be calculated in real-time or it may also periodically re-calculated (for example, this may be a nightly process, where the stored values from previous night are used for real-time use the next day). Again, the steps of the representative bandwidth information calculation may be mapped into map-and-reduce framework for big-data analytics.

The traffic measurements are done by network elements and are made available to the RBC 502 module and/or the representative bandwidth calculator operation 600. The overbooking calculator may retrieve the measurements on its own. Optionally, the measurements may be stored in the traffic measurement database 524, or the measurements may be obtained and kept locally in the RBC 502, such as in a compressed or summarized form.

The traffic measurements can be combined to decrease complexity or to meet business needs. For example, all flows connecting an A-Z point may be combined, all flows of a single customer may be combined across all A-Z's used by the customer, all flows in a virtual sub-network may be combined, or all flows in the network may be combined. Other combinations are also possible. Combined measurements are processed to determine a statistical representation of the traffic—its representative bandwidth. The statistical representation can be determined with a traffic envelope representation (FIG. 9), an effective bandwidth representation (FIG. 10), or a service curve representation (FIG. 11).

Retiming of Measurements

Traffic measurements can be combined for complexity reduction and to meet business goals (i.e., fidelity goals of representative bandwidth). Since measurements from different network elements may be collected at different times and with different cycles, it is necessary to retime the combined measurements with a common period. Assume that the measurements are given as an ordered list of triplets $(t_i, \Delta_i, s_i)$, $t_i$ is time measurement was taken, $\Delta_i$ is duration over which the measurement was taken, and $s_i$ is the size recorded during the measurement period.

With respect to the information contained in the measurements, it is assumed that the packet traffic measurements are packet counters, or other flow information collected by network elements, over the measurement period $\Delta\_i$ and that the connection level measurements are obtained from call records and correspond to total committed bandwidth over the measurement period. In a network, there may be multiple sets of measurements $(f)=\{(t_i, \Delta_i, s_i), i=1, \ldots, n_f\}$ and the index of the measurements f, may correspond to a Transmission Control Protocol (TCP) flow, A-Z flow, or a point-to-point link etc. Measurements can be merged by combining ordered lists from different sources to obtain the requested granularity level. The merged lists keep the ordering in time and can be further simplified by combining overlapping entries into a single entry. The lists can be merged to obtain the requested input data. For a network, sub-network or link measurements may be merged from all applicable links. For a virtual network or A-Z flow, A-Z measurements may be merged from all applicable A-Z flows. For customers or QoS, the applicable measurements may be filtered to remove unwanted customers, QoS levels, or values which correspond time periods which are not of interest, for example least busy period. The applicable measurements may also be filtered by the requested bandwidth size or other properties.

The merged list is sampled at time points $t_0$, $t_0+\Delta$, $t_0+2\Delta$, .... Each sample contains the sum of all time measurements in the previous period. Sample $s_i$ at time $t_0+i\Delta$, is the sum of all measurements that were taken after time $t_0+(i-1)\Delta$, but strictly before time $t_0+i\Delta$. Long samples are broken into multiple sampled periods, proportional to the amount of time the sample overlaps with that period. Samples of the measurements $s_0, s_1, \ldots, s_n$ are used to find a statistical representation of the measured traffic.

Traffic Envelope Representation

Figure 9:
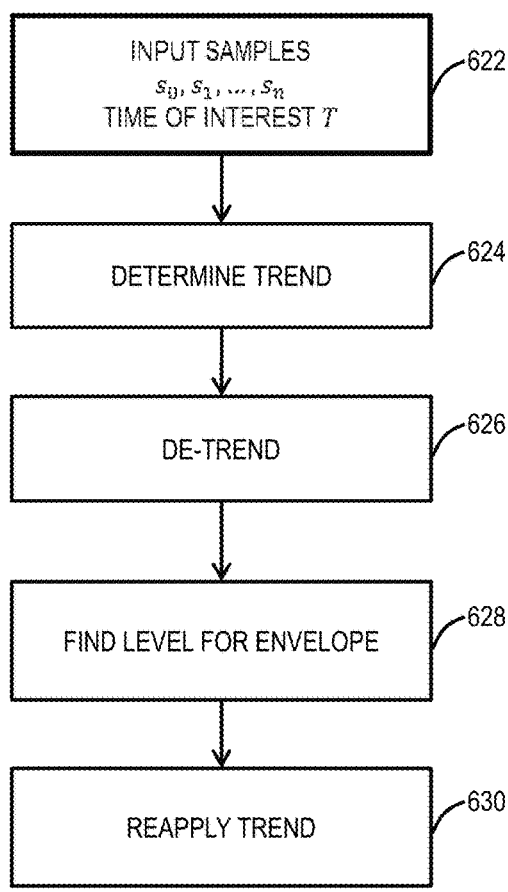
FIG. 9 is a flow chart of a traffic envelope representation process.

Referring to FIG. 9, in an exemplary embodiment, a flow chart illustrates a traffic envelope representation process 620. The traffic envelope representation process 620 includes receiving an input of samples $s_0, s_1, \ldots, s_n$ for a historical time-range of interest T (step 622), determining a trend (step 624), de-trending (step 626), finding a level for an envelope (step 628), and reapplying the trend (step 630). The traffic envelope is determined as a value that a traffic does not exceed with some probability. The traffic envelope can be determined from historical data and examining the historical CDF of the data to find the threshold not exceed for the given percentage of time. The additive property comes by finding out the acceptable probability that the aggregate traffic envelope traffic does not exceed the capacity of a link. For example, suppose 2% envelopes are used, then if there are three connections traversing a link, there is about 6% probability that link capacity would be exceeded (for a small number of connections there is a linear relationship).

A trend can be determined using a moving average of the samples, such as:

$$m_i = \frac{1}{L}\sum_{k=0}^{L} s_{i-k}, i \geq L$$

Weighted filters may also be used (i.e., exponential moving average).

De-trended data may be obtained by dividing samples by the trend and removing the mean, such as:

$$d_i = \frac{s_i}{m_i} - \overline{m}, i \geq L, \text{ where } \overline{m} = \frac{1}{n}\sum_{k=L}^{n}\frac{s_i}{m_i}$$

De-trended data isolates a random component of the measured data. De-trended data is used to find a traffic level for which only a percentile of the traffic exceeds a bound. The level ($\epsilon$) for percentile $\epsilon$ is defined as $\Pr[d_i > D(\epsilon)] \leq \epsilon$. Level ($\epsilon$) is obtained from the empirical CDF of the de-trended data.

Envelope of the measured data can be obtained from the trend and the de-trended data, such as:

$$e_i(\Delta,\epsilon) = D(\epsilon)m_i + \overline{m}m_i, \text{ for traffic that satisfies the envelope } \epsilon \text{ percent of the time.}$$

A reasonable number for $\epsilon$ may be in the range: $0.9 \leq \epsilon \leq 0.999999$. There are two special case envelopes—the worst case envelope: $e_i(0) = (\max_i\{d_i\} + \overline{m})m_i$ and the mean envelope: $e_i(\overline{m}) = (\overline{m})m_i$.

The envelope is defined as a set of points $\epsilon(\Delta,\epsilon) = \{e_i(\Delta,\epsilon), L \leq i \leq n\}$ for times, $t \in \{t_0+(i-1)\Delta, L \leq i \leq n\}$, which correspond to sampling times. Points on the envelope for a time T or a set of times, which is not in the set of sampling times t, can be obtained with an approximation of the traffic envelope. For a past time T, a point on the envelope can obtained with linear regression or other appropriate methods. For a future time T, a point on the envelope can forecast with linear regression, where line parameters for future times are obtained from past samples, or other appropriate methods.

Effective Bandwidth Representation of Traffic

Figure 10:
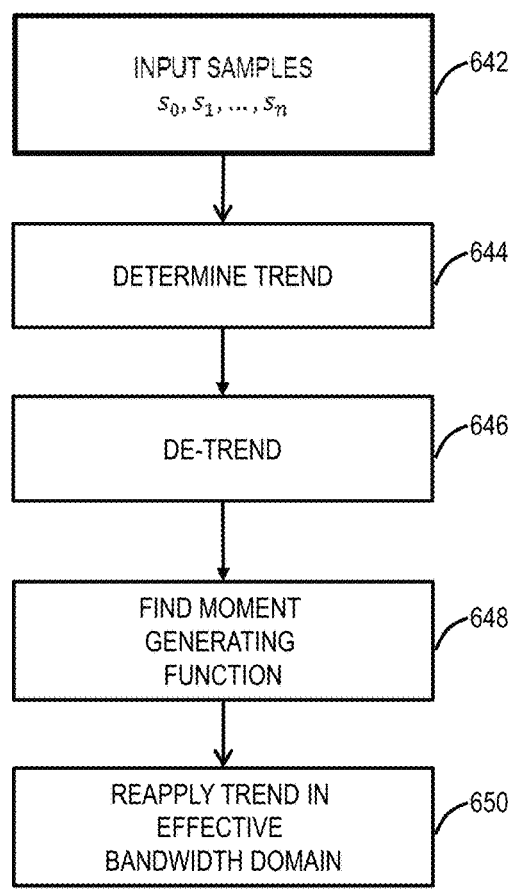
FIG. 10 is a flow chart of an effective bandwidth representation process.
Figure 11:
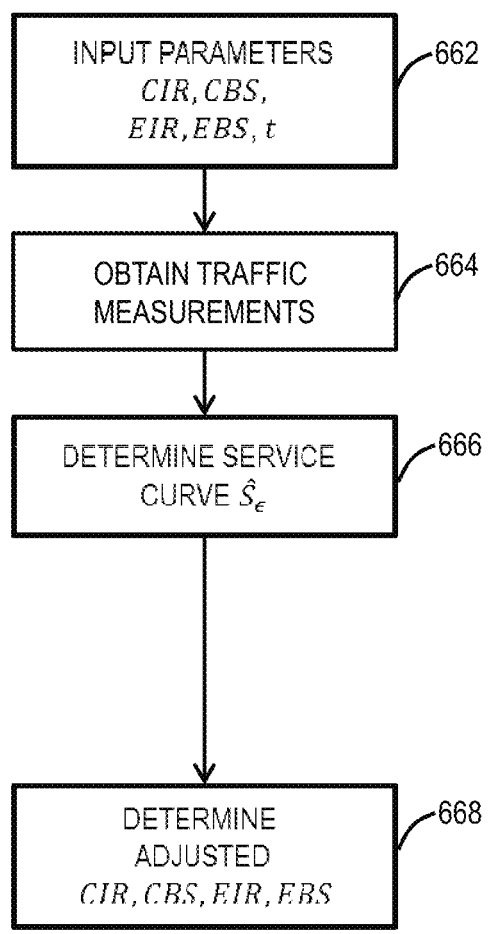
FIG. 11 is a flow chart of a service curve representation process.

Referring to FIG. 10, in an exemplary embodiment, a flow chart illustrates an effective bandwidth representation process 640. The effective bandwidth representation process 640 includes receiving an input of samples $s_0, s_1, \ldots, s_n$ (step 642), determining a trend (step 644), de-trending (step 646), finding a moment generating function (step 648), and reapplying the trend in the effective bandwidth domain (step 650). The systems and methods described herein rely on effective bandwidth, which is used to set a probabilistic bound on exceeding the capacity on the links throughout the network. Bandwidth estimates and capacities are both translated in the effective bandwidth "domain", where the probabilistic bounds are valid. For traffic with X bytes observed in $\Delta$ seconds, effective bandwidth $\alpha$ is defined as:

$$\alpha(\gamma) = \frac{1}{\gamma\Delta}\log E[e^{\gamma X}],$$

where $\gamma$ is a scalar.

The link capacity in the effective bandwidth domain $\beta(\epsilon)$ for a probability of exceeding capacity $\epsilon$ is found in F. P. Kelly, "Notes on effective bandwidths," In Stochastic Networks: Theory and Applications (Editors F. P. Kelly, S. Zachary and I. B. Ziedins) Royal Statistical Society Lecture Notes Series, 4. Oxford University Press, 1996. 141-168 (www.statslab.cam.ac.uk/~frank/eb.pdf). In the effective bandwidth domain, the additive property $\Sigma_i \alpha_i(\gamma) \leq \beta_j(\epsilon)$ for a set of traffic flows $X_i$ traversing a link j is equivalent to $\Pr[\Sigma_i X_i > \Delta C_j] < \epsilon$. For the effective bandwidth approach, $X_i$ is typically an accumulation of some observation, i.e., a number of packets between sampling times, or the number of established fixed-size connections in the sampling time.

The steps to obtain an effective bandwidth reservation are outlined as follows. The trend can be determined using a moving average of the samples such as:

$$m_i = \frac{1}{L}\sum_{k=0}^{L} s_{i-k}, i \geq L$$

Weighted filters may also be used (i.e., exponential moving average).

De-trended data may be obtained by dividing samples by the trend and removing the mean such as:

$$d_i = \frac{s_i}{m_i} - \overline{m}, \, i \geq L, \text{ where } \overline{m} = \frac{1}{n}\sum_{k=L}^{n} \frac{s_i}{m_i}$$

De-trended data isolates a random component of the measured data.

Effective bandwidth is obtained using the relation which assumes that $s_i$ are independent and identically distributed (i.i.d.):

$$\frac{1}{\gamma\Delta} \log E[e^{\gamma s_i}] =$$

$$\frac{1}{\gamma\Delta} \log E[e^{\gamma(d_i+\overline{m})m_i}] = \frac{1}{\gamma\Delta} \log E[e^{\gamma d_i m_i} e^{\gamma \overline{m} m_i}] = \frac{1}{\gamma\Delta} \log E[e^{\gamma d_i m_i}] + \frac{\overline{m} m_i}{\Delta}$$

De-trended data is used to obtain an estimate of the moment generating function $$E[e^{\gamma d_i m_i}] \approx \overline{m_e} = \frac{1}{n}\sum_{k=L}^{n} e^{\gamma d_i m_i}$$

An estimate of the effective bandwidth is obtained by:

$$\alpha(\gamma) = \frac{1}{\gamma\Delta} \log \overline{m_e} + \frac{\overline{m} m_i}{\Delta}$$

Other forms of representative bandwidths are also possible, such as:

$$\alpha(\gamma) = \sum_{i=1}^{K} \frac{a_i}{\gamma_i \Delta} \log E[e^{\gamma_i X}] + b,$$

(see G. L. Choudhury, D. L. Lucantoni, W. Whitt, "Squeezing the most out of ATM," IEEE Transactions on Communications, vol. 44, no. 2, February 1996). Also by varying the sampling times it is possible to obtain effective bandwidths with more or less burstiness (burstiness decreases if the sampling times increase).

Service Curve Representation of Traffic

Referring to FIG. 11, in an exemplary embodiment, a flow chart illustrates a service curve representation process 660. The service curve representation process 660 includes determining or receiving input parameters—Committed Information Rate (CIR), Committed Burst Size (CBS), Excess Information Rate (EIR), Excess Burst Size (EBS), and time, t (step 662), obtaining traffic measurements (step 664), determining a service curve $\hat{S}_\epsilon$ (step 666), and determining an adjusted CIR, CBS, EIR, EBS (step 668). This method of traffic representation relies on network calculus concepts. The envelope of the traffic is used to calculate the service curve required by the traffic. The service curve is used to design traffic shaping parameters that meet delay requirements, which is the representative bandwidth for the traffic. Required network capacity can be found on each link in the network from end-to-end service curves traversing the links using network calculus in the min-plus algebra domain.

The input parameter t is the time for which the traffic shaper parameters are estimated, which may be a future time. The input parameters CIR, CBS, EIR, EBS are used to obtain traffic shaping envelope defined by CBS, $CIR_{max}$, EBS, $EIR_{max}$ for a reference time $t_{CIR}$:

$$CIR_{max} = (CBS + CIRt_{CIR})/t_{CIR}$$

$$EIR_{max} = (CBS + EBS + EIRt_{CIR})/t_{CIR}$$

Related to $CIR_{max}$ and $EIR_{max}$ is the maximum delay in the buffer $D_{max}$. $CIR_{max}$ and $EIR_{max}$ can be calculated by limiting the horizontal distance between the upper envelope and the service curve S using (min-plus algebra and network calculus).

Figure 12:
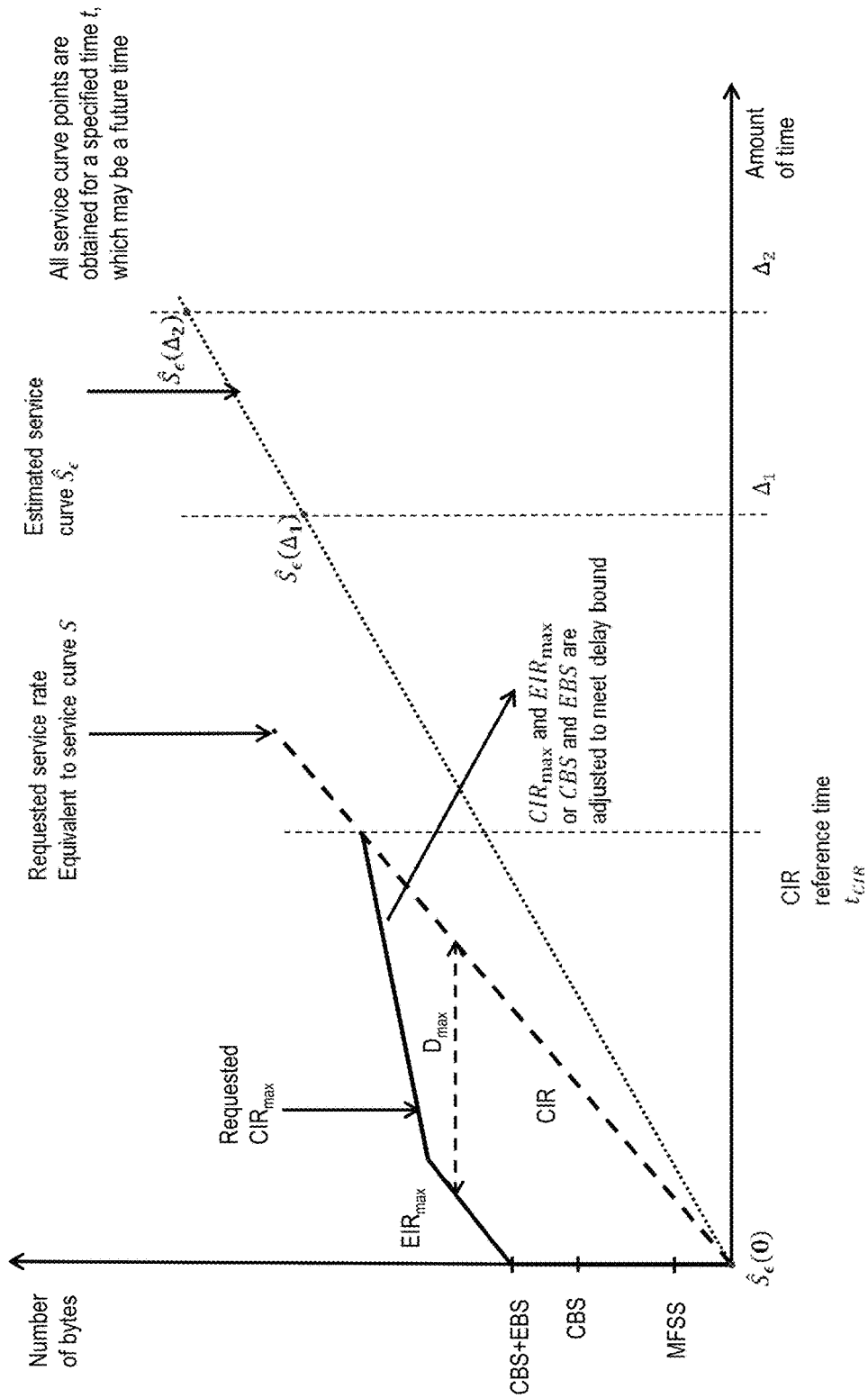
FIG. 12 is a graph of an exemplary operation of the service curve representation process of FIG. 11.

Referring to FIG. 12, in an exemplary embodiment, a graph illustrates an exemplary operation of the service curve representation process 660. The service curve is determined using the traffic envelope representation process 620. The traffic envelope is a function of time and probabilistic factor $\epsilon$. The Service envelope is a function of cumulative traffic in a time period $\Delta$. $\hat{S}_\epsilon(\Delta)$ is a point on the service curve. The service curve $\hat{S}_\epsilon$ is obtained from multiple traffic envelopes for different sampling intervals $\Delta$. $\hat{S}_\epsilon(\Delta)$ is obtained from the traffic envelope (from the traffic envelope representation process 620) $\epsilon(\Delta,\epsilon)$ at input time t, which indicates how much traffic may offered (should be served) in the period of time $\Delta$, within the probability $\epsilon$. Typically, the sampling time $\Delta$ is a large-scale time parameter (minutes) and it may be necessary to project the service curve to millisecond or micro-second scale. Linear regression or other appropriate methods may be used. The slope of the estimated service becomes the estimated committed rate, $\widehat{CIR}$, which can also be used to determine traffic shaping parameters to meet delay bounds. Other traffic shaping parameters can be determined from $\widehat{CIR}$ to obtain a desired maximum delay. The service curve and the adjusted traffic shaping parameters may be used to provision or plan end-to-end services.

Auto-Tuning of Overbooking Parameters

Figure 13:
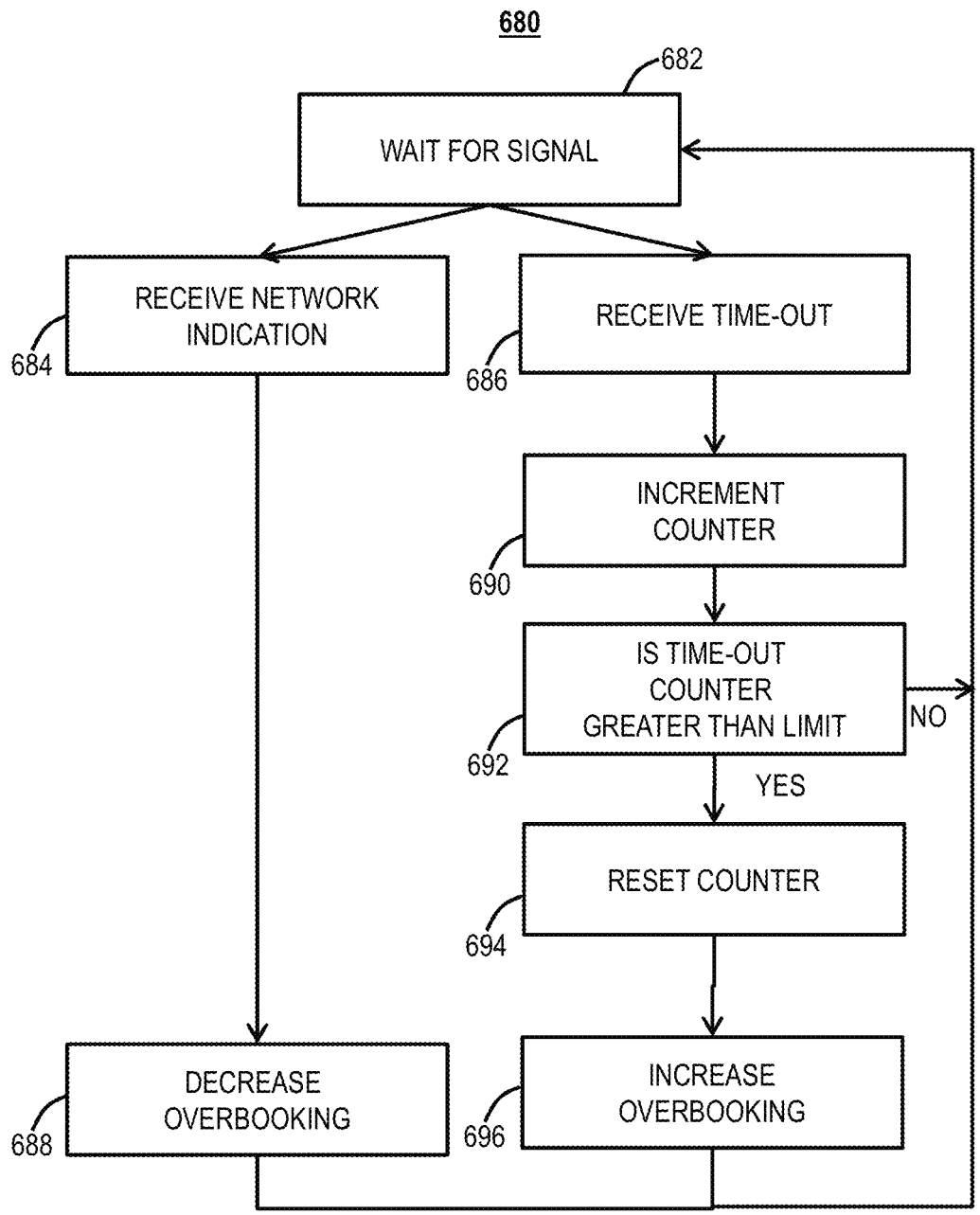
FIG. 13 is a flow chart of an auto-tuning process of overbooking parameters.

Referring to FIG. 13, in an exemplary embodiment, a flow chart illustrates an auto-tuning process 680 of overbooking parameters. Internal parameters for the overbooking are difficult to obtain, or know a priori. The conventional approach is trial and error and is even more difficult if overbooking is done at a fine level. The auto-tuning process 68 adjusts internal parameters based on network feedback. When the network feedback indicates worsening QoS conditions, internal parameters are adjusted to obtain pessimistic representative bandwidth information. When the network feedback indicates improving QoS, internal parameters are adjusted to obtain optimistic representative bandwidth information. Pessimistic representative bandwidth information leads to fewer accepted connections than optimistic representative bandwidth information.

The auto-tuning process 680 includes waiting for a signal (step 682) and receiving either a network indication (step 684) or a time-out (step 686). The network indication can be an indication that packet losses are exceeding a bound, such as on a link, a set of links, a node, an end-to-end flow, an end-to-end flow on a link, a set of flows on a link, or a set of flows on a path. The network indication can also be an indication that delay is exceeding a bound, such as on a link, a set of links, a node, an end-to-end flow, an end-to-end flow on a link, a set of flows on a link, or a set of flows on a path. Further, the network indication can be an indication that demand for network services is decreasing at the same price level (assume due to poor network quality). Responsive to the network indication, the auto-tuning process 680 includes decreasing overbooking (step 688). Responsive to the time-out, the auto-tuning process 680 includes incrementing a counter (step 690), and waiting for the network indication (step 692) up to a time out when the counter is reset (step 694) and the auto-tuning process 680 includes increasing overbooking (step 696).

If a network indicator is for A-Z flow, the overbooking may be changed for all flows traversing the same path. If the network indicator is for a link, the overbooking may be changed for all A-Z flows traversing the link. If the network indicator is for a network, the overbooking may be changed for all A-Z flows traversing the network. The internal parameters are changed as follows: For pessimistic overbooking: Traffic envelope percentile $\epsilon \leftarrow \epsilon+\delta$; Effective bandwidth: $\gamma \leftarrow \gamma/\phi$; and Service curve: $D_{max} \leftarrow D_{max} - D$. For optimistic overbooking: Traffic envelope percentile $\epsilon \leftarrow \epsilon - S$; Effective bandwidth: $\gamma \leftarrow \phi\gamma$; and Service curve: $D_{max} \leftarrow D_{max} + D$. Multiple parameters may be changed at the same time (using the same counter), or separately using separate counters.

Admission Control Interaction with the RBC

Referring to FIG. 14, in an exemplary embodiment, a flow chart illustrates an admission control process 700 showing interaction between the admission control 504 module and the RBC 502. Again, the admission control 504 module determines if a connection should be accepted in the network and the RBC 502 module provides information used to determine how much of the available bandwidth should be reserved for the incoming request. The admission control process 700 includes receiving a traffic request (step 702), requesting/receiving representative bandwidth information (step 704), determining the representative bandwidth (step 706), checking for bandwidth availability (step 708), and admitting or rejecting the connection (step 71).

Traffic requests contain a bandwidth requirement, which may be in terms of peak rate (CBS, CIRmax), average rate (CIR), or the like and may contain lower bound, upper bound on bandwidth and earliest time and latest time and duration for the bandwidth. The bandwidth request may be the maximum bandwidth required. For admission control purposes the request should be converted to actual or expected bandwidth usage. The representative bandwidth information is obtained from the RBC to convert from request to expected bandwidth usage. An overbooking factor may be obtained, or a representative bandwidth may be obtained. More than one overbooking factor may be obtained, e.g., one for each path in a virtual network. If the request is scheduled for a future time, the RBC may return forecasted values. If the request is recurrent, the RBC may return values for each for each recurring period taking foresting into consideration. If the network has seasonality, the RBC may return seasonal value corresponding to each season.

The representative bandwidth is used to determine if a path or sub-network of sufficient capacity exists for the request. This operation may be performed by a path computation and selection element, such as described in commonly assigned U.S. patent application Ser. No. 14/516,985 filed Oct. 17, 2014 and entitled "OPTICAL AND PACKET PATH COMPUTATION AND SELECTION SYSTEMS AND METHODS," the contents of which are incorporated by reference herein. The admission control 504 module returns a decision to accept or reject a connection. If the connection is accepted, the admission control 504 module updates the flow database 522 and the topology database 520. The connection may be rejected if the PCE component returns no path. The connection may be rejected if the PCE component returns a path, but the bid price for the connection is too low.

Network Planning

Referring to FIG. 15, in an exemplary embodiment, a flow chart illustrates a network planning process 720 that can be implemented in the network planning 508 module. The network planning process 720 includes receiving a network planning trigger (step 722), retrieving pricing information (step 724), retrieving network load information (step 726), determining representative network load (step 728), planning a network upgrade (step 730), and notifying network upgrade changes (step 732). The network planning process 72 may be triggered from the network analytics 510 module after detecting an increase in congestion on a link or throughout the network. Other triggers are also contemplated.

The pricing information may be bandwidth pricing with demand curve information, such as the demand curve to calculate network performance if not upgraded, the demand curve reflecting price sensitivity, or static bandwidth prices. The representative network load is the representative bandwidth information is obtained from the RBC 502. The information may be looked-up for each pair of A-Z flows or for each pair of A-Z by price or QoS. The network load information and forecast can be Obtained from the network analytics 510 module. If representative bandwidth is returned by the RBC 502, the RBC 502 can also obtain this information. The network load information corresponds to requested bandwidth, not measured used bandwidth (which may not be available). The information may be an estimate of current bandwidth requests, a forecast of bandwidth requests, a traffic demand matrix (A-Z CIRS), etc.

The representative network load is obtained to reflect true network usage. If the network planning 508 module uses CIR-based estimates, an overbooking factor may be used to determine representative bandwidths (by dividing the OR with the overbooking factor). The network planning 508 module may also use representative bandwidth provided directly by the RBC 502. The representative bandwidth information may be used to adjust revenue curve for usage-based pricing. Some CIR requests may come from users who request a lot, but use a little skewing their expected revenue (representative bandwidth information can correct that). The network planning process 720 may be accomplished with a revenue based optimization, such as described in G. Gallego and G. van Ryzin, "A multiproduct dynamic pricing problem and its application to network yield management," Operations Research, January-February 1997, Vol. 45, No. 1, pp. 24-41, e.g., to attain maximum throughput maximum planning goal, set everyone's price to be 1 per bit and ignore demands.

Revenue Maximizer Operation

Figure 16:
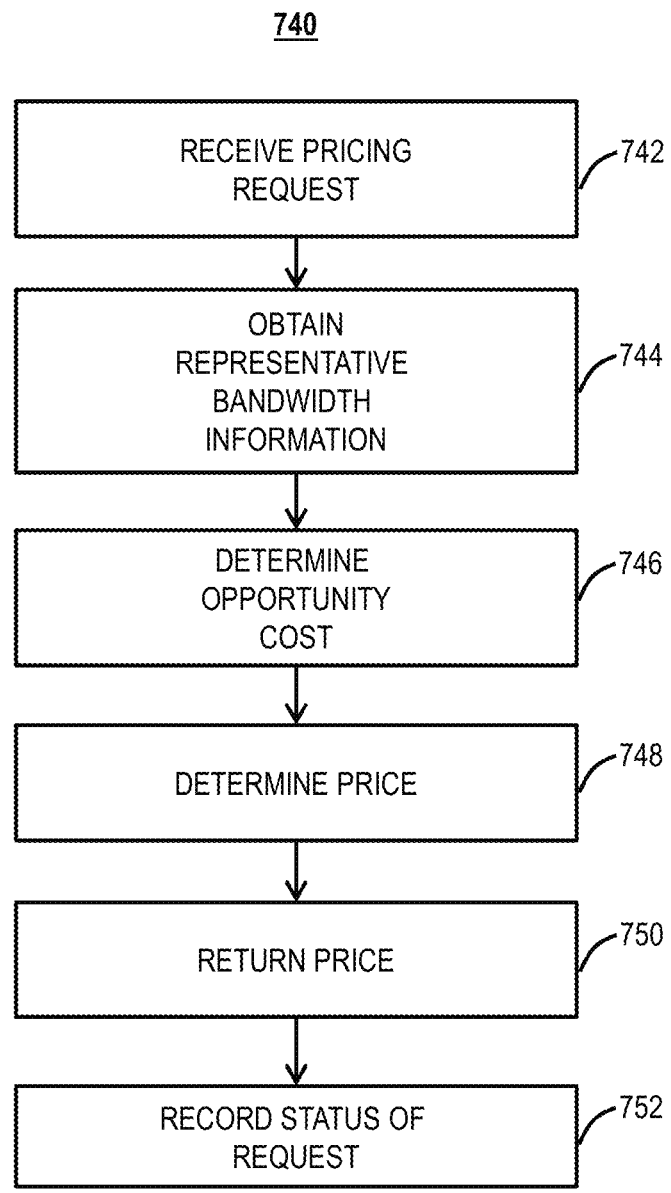
FIG. 16 is a flow chart of a revenue maximizer operation implemented by the dynamic pricing module.

Referring to FIG. 16, in an exemplary embodiment, a flow chart illustrates a revenue maximizer operation 740 implemented by the dynamic pricing 506 module. The revenue maximizer operation 740 includes receiving a pricing request (step 742), obtaining representative bandwidth information (step 744), determining opportunity cost (step 746), determining pricing (step 748), returning the price (step 75), and recording a status of the request (step 752). The pricing request may contain bandwidth requirement, topology requirement, QoS requirements, or the like and may contain lower bound, upper bound on bandwidth and earliest time and latest time and duration for the bandwidth. The representative bandwidth information is obtained from the RBC 502. Multiple representative bandwidths may be obtained for different times, seasons, periods. The representative bandwidth information may be a forecast if a connection is requested in future or for a long time. The representative bandwidth information may contain representative bandwidth, or may be used to obtain representative bandwidth from the requested bandwidth with the overbooking factor.

The opportunity cost is obtained from the representative bandwidth, which is used to calculate difference in revenue from admitting and not admitting the connection. The expected revenue of admitting the connection is obtained from the representative bandwidth and forecast of how much of committed bandwidth could be sold to other connections. Representative bandwidths may also be obtained for all A-Z flows according to their CoS to determine the nesting limits used in the dynamic pricing 506 module. Many other approaches are also possible (see, e.g., D. Bertsimas, I. Popescu, "Revenue Management in a Dynamic Network Environment", Transportation Science, Vol. 37, No. 3, August 2003). The opportunity cost is used to calculate the price that should be charged to admit the connection. The price may be the opportunity cost itself or the opportunity cost adjusted with the demand curve (i.e., multiplied by probability the user may reject the offered price). The status of the request is recorded for future pricing demands, i.e., offered price for the request, price acceptance, and other information (current demand, time of day, etc.).

Network Measurements

The framework described herein assumes that network elements have some way of tracking network usage. For example, packet counters may be deployed to count packets of flows on network elements. Other counters may also be available, e.g. counters showing number of packets in each traffic shaping color. It is also assumed that since the network element storage is not permanent, packet measurements are occasionally transferred to permanent store in the network management cloud, i.e., the traffic measurement database 524. Statistically, these traffic measurements are samplings of a random process which corresponds to the packet accumulation on the network elements. Due to clock imprecise synchronization, these samples may have to be re-sampled or reorganized in time, i.e., retimed for signal processing done in the RBC 502. Other sources of data may also be possible, such as call records of OTN connections and the like. Before processing these records, they may have to be aggregated and then sampled to show the number of connections that are in the system over the sampling period. This sampling action makes it possible to analyze call records and packet records using the same statistical engine. The details of the sampling method may be hidden through an appropriate procedure call for a "map" operation in a data storage and messaging layer (e.g., map-reduce).

RBC Location

The RBC 502 described herein is a logical element which may reside in multiple locations in a control plane, the network, etc. The RBC 502 may be a library with static linkage to other components in the control plane. The RBC 502 may be a standalone application in the SDN controller 60, which may provide an interface to other applications. The RBC 502 may be a standalone application using the SDN northbound interface to talk to. The RBC 502 may be implemented as a virtual network appliance providing services to other virtual network appliances in the control plane using Remote Procedure Call (RPC) or a network protocol for communications. The RBC 502 may be a standalone network element providing services to other network elements or SDN controller applications using RPC or a network protocol for communications. The RBC 502 may be a sub-module of the network analytics 510 module. The RBC may be implemented on a single CPU hardware element or a hardware element containing special purpose hardware (e.g. graphical processing unit—GPU), etc. The RBC may be implemented as a multi-processor cloud application using a library with map-reduce framework.

Representative Bandwidth Information Exchange

In FIG. 6, the RBC 502 contemplates receiving a representative bandwidth information request (a request from an outside module to the RBC 502) as well as providing a representative bandwidth information response (a response from the RBC 502 to other modules). The representative bandwidth information request can include a type of bandwidth request with mean rate, peak rate, Metro Ethernet Forum (MEF) User Network Interface (UNI) bandwidth request (e.g. CIR or CIR+CBS); a type of traffic with QoS specification (maximum delay, maximum delay variation, maximum packet loss, maximum outage time); source-destination network elements (point-to-point, point-to-multipoint, multipoint-to-multipoint); a customer profile; a fidelity of the representative bandwidth information (network wide, sub-network wide, virtual network wide, A-Z, any of the preceding for a specific customer, any of the preceding for a given traffic type/bandwidth request); a time range of the request (start time, end time, periodicity); a representation type (type of representative bandwidth information (effective bandwidth, mean bandwidth calculation, network calculus, type of timing request (past, forecast)); and requested bandwidth. The representative bandwidth information response can include type of statistical processing (linear regression, Poisson regression, polynomial regression); representative bandwidth information (one time point, sequence of representative bandwidth information for a time span, sequence of representative bandwidth information for a time cycle); single-parameter or multi-parameter representative bandwidth information (traffic envelope value or traffic envelope value and percentage of exceeding it, equivalent bandwidth value, traffic shaper parameters).

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for a representative bandwidth calculation in a network, the method comprising:
   receiving a request for representative bandwidth information;
   obtaining network measurements;
   combining, filtering, and retiming the network measurements based on the request, to determine inputs for a determination of the representative bandwidth information, wherein the representative bandwidth information has an additive property in an algebraic domain based on the combining, filtering, and retiming, wherein the additive property comprises associated representative bandwidth information for traffic being additive on a link with their cumulative traffic having a known probability of exceeding link capacity of the link, wherein the representative bandwidth information is an approximation of historical traffic and its forecast to provide the additive property, and wherein the algebraic domain is one of real-number addition using traffic envelopes as input and calculating the statistical bound considering the number of flows traversing a link; an effective bandwidth domain calculating a statistical bound on flows traversing a link; or min-plus algebra calculating a statistical bound on flows traversing a link using network calculus;
   determining the representative bandwidth information using the inputs through one of i) a traffic envelope representation which determines the representative bandwidth information from a traffic envelope based on the inputs over time and a probability value that aggregate traffic envelope traffic does not exceed capacity of the link, ii) an effective bandwidth representation which determines the representative bandwidth information through trending, de-trending, finding a moment generating function, and reapplying the trend based on the inputs, and iii) a service curve representation using the inputs to derive curves and using the curves to determine the representative bandwidth information; and
   utilizing the representative bandwidth information for admission control of an incoming connection.

2. The method of claim 1, wherein the combining, filtering, and retiming comprises combining and filtering the network measurements at a granularity of the network, a sub-network of the network, a link of the network, a virtual network of the network, an end-to-end flow in the network, a customer in the network, or a class-of-service in the network, wherein the granularity is based on the request, and synchronizing sampling times across the network measurements.

3. The method of claim 1, wherein the combining, filtering, and retiming comprises combining and filtering the network measurements to obtain historical time samples corresponding to busy periods in the past, based on the request, and synchronizing sampling times across the network measurements.

4. The method of claim 1, wherein the network measurements are merged for the retiming by combining ordered lists from different sources to a requested granularity level.

5. The method of claim 1, wherein the additive property enables the representative bandwidth information to be used for the admission control, overbooking determinations, network planning, and/or dynamic pricing in the network.

6. The method of claim 1, wherein the representative bandwidth information is for packet data with variable bandwidth and/or connection-based services with fixed bandwidth.

7. The method of claim 1, wherein the representative bandwidth information is based on a traffic envelope representation which is a value that a traffic does not exceed with some probability.

8. The method of claim 1, wherein the representative bandwidth information is based on an effective bandwidth representation which has a probabilistic additive property in an effective bandwidth domain.

9. The method of claim 1, wherein the representative bandwidth information is based on a service curve representation that uses a min-plus algebra domain.

10. The method of claim 1, further comprising:
    utilizing the representative bandwidth information to auto-tune overbooking parameters in the network.

11. The method of claim 1, further comprising:
    utilizing the representative bandwidth information for admission control to admit or reject a connection in the network.

12. The method of claim 1, further comprising:
    utilizing the representative bandwidth information in network planning to reflect true network usage in the network.

13. The method of claim 1, further comprising:
    utilizing the representative bandwidth information to determine a price of a connection in the network.

14. The method of claim 1, wherein the representative bandwidth information is determined at various granularity levels in the network from historically observed measurements and future forecasts to automatically adjust overbooking parameters in the network.

15. A server configured to perform a representative bandwidth calculation in a network, the server comprising:
    a network interface;
    a processor coupled to the network interface; and
    memory storing instructions that, when executed, cause the processor to
       receive, via the network interface, a request for representative bandwidth information,
       obtain network measurements,
       combine, filter, and retimed the network measurements based on the request to determine inputs for a determination of the representative bandwidth information, wherein the representative bandwidth information has an additive property in an algebraic domain based on the combined, filtered, and retimed network measurements, wherein the additive property comprises associated representative bandwidth information for traffic being additive on a link with their cumulative traffic having a known probability of exceeding link capacity of the link, wherein the representative bandwidth information is an approximation of historical traffic and its forecast to provide the additive property, and wherein the algebraic domain is one of real-number addition using traffic envelopes as input and calculating the statistical bound considering the number of flows traversing a link; an effective bandwidth domain calculating a statistical bound on flows traversing a link; or min-plus algebra calculating a statistical bound on flows traversing a link using network calculus, determine the representative bandwidth information using the inputs through one of i) a traffic envelope representation which determines the representative bandwidth information from a traffic envelope based on the inputs, ii) an effective bandwidth representation which determines the representative bandwidth information through trending, de-trending, finding a moment generating function, and reapplying the trend based on the inputs, and iii) a service curve representation using the inputs to derive curves and using the curves to determine the representative bandwidth information; and utilize the representative bandwidth information for admission control of an incoming connection.

16. The server of claim 15, wherein the representative bandwidth information is determined at various granularity levels in the network from historically observed measurements and future forecasts to automatically adjust overbooking parameters in the network.

17. The server of claim 15, wherein the server is either a Software Defined Networking (SDN) controller or coupled to an SDN controller.

* * * * *